J. B. MORRISON.
Improvement in Dental-Engines.
No. 5,143. Reissued Nov. 12, 1872.
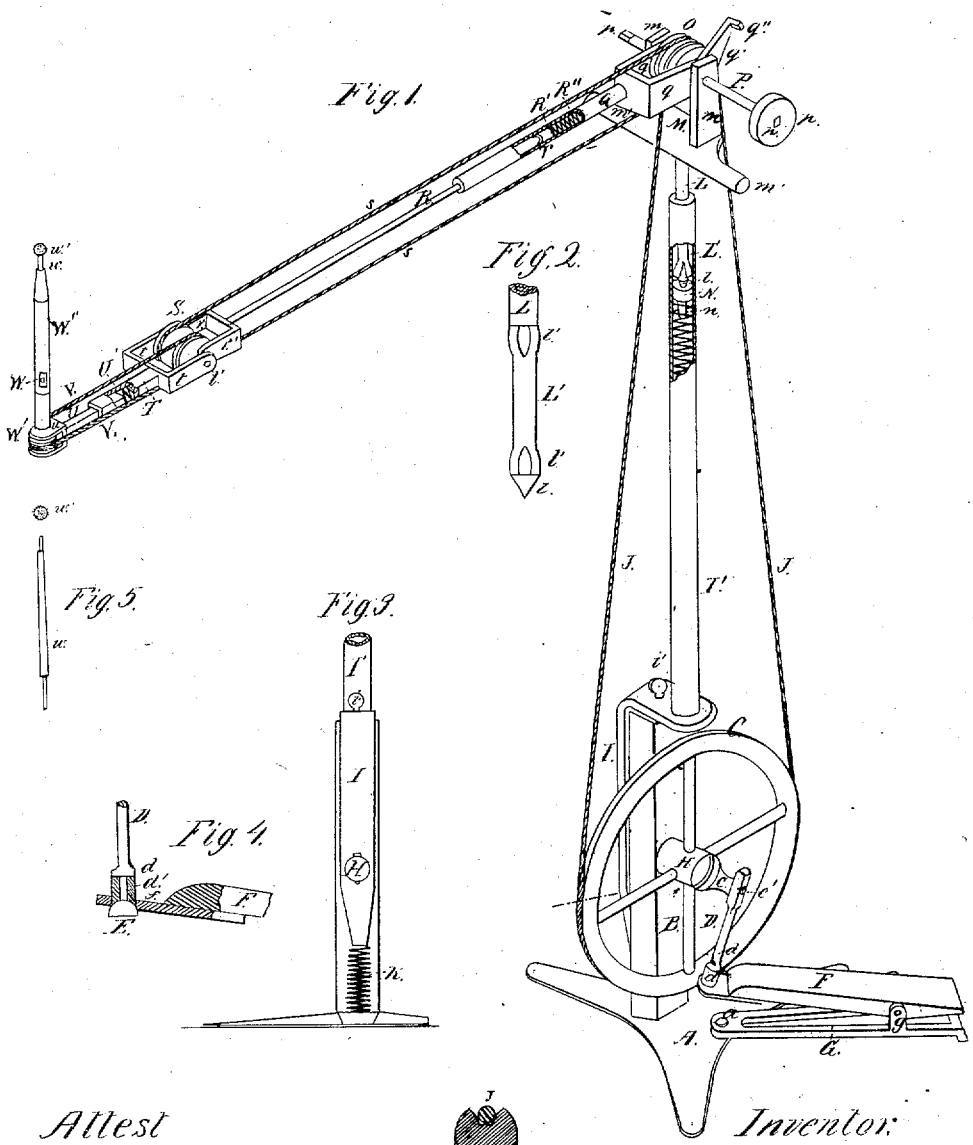
Attest
Homer Gadde
Wm. H. Morrison
Inventor:
James B. Morrison
THE NORRIS PETERS CO., PHOTO-LITHO., WASHINGTON, D. C.

UNITED STATES PATENT OFFICE.

JAMES B. MORRISON, OF ST. LOUIS, MO., ASSIGNOR TO JOHNSTON BROS.

IMPROVEMENT IN DENTAL ENGINES.

Specification forming part of Letters Patent No. 111,667, dated February 7, 1871; reissue No. 5,143, dated November 12, 1872.

*To all whom it may concern:*

Be it known that I, JAMES B. MORRISON, of the city of St. Louis, in the county of St. Louis and State of Missouri, am the original and first inventor of certain new and useful Improvements in Dental Engines; and I do hereby declare that the following is a full, clear, and exact description of the same, reference being had to the accompanying drawing forming part of this specification.

My invention relates to certain improvements in that class of dental drilling-machines particularly designed for operating upon the teeth while in the mouth; and the nature of this invention may be briefly stated as consisting in the application of continuous rotary motion to a dental tool by means of a shaft, which is wholly or partially enveloped by a sleeve or hand piece, and which has a pulley attached to it, whereby many useful and valuable results are obtained, as will be hereinafter fully described and specifically set forth.

In the accompanying drawing, Figure 1 is a perspective view of a dental engine containing my present improvements. Fig. 2 is a side elevation in detail (on a larger scale than Fig. 1) of the spring-sleeve and pintle for permitting the arm which supports the operating tool to swing round horizontally. Fig. 3 is a side elevation of the lower part of the upright shaft or vertical part of the tool-supporting arm, showing a means whereby the shaft or arm may be rocked or oscillated in a lateral direction for facilitating the insertion in and withdrawal from the mouth of the operating tool. Fig. 4 is a sectional view, showing the manner of attaching the moving part of the treadle to the pitman extending from the crank of the belt-wheel or pulley. Fig. 5 is a view showing a dental burring-tool made in two parts.

A designates a tripod or stand, from which rises a standard, B, to which it is secured. C is a pulley or belt-wheel, mounted on a shaft, H, which passes through and is secured to the standard B. The pulley C is provided with a crank, *c*, which receives a pitman, D, the lower end of which pitman is provided with a knob, E, (see Fig. 4,) the upper side of which knob is spherical; and the forward end of the movable part F of the treadle is provided with a hole, *f*, which is countersunk on the under side, so that when the pitman D is inserted through this hole the concavity of the countersink will correspond with the convexity of the knob E and permit the movable part F of the treadle to readily swing around. The said pitman is provided with a collar, *d*, between which and the treadle a ring, *d'*, of India rubber is placed for the purpose of keeping the end of the part F of the treadle in contact with the knob and to prevent rattling. The part F of the treadle is pivoted to a frame or base, G, as shown at *g*, and this base or frame is pivoted at its forward end to the stand A by a stud, *a*. The point at which the frame G is pivoted to the stand should be vertically beneath the wrist-pin *c'* of the crank *c*, when the crank points vertically, so as to keep the treadle in a proper operative position however much it may be thrown round to right or left, and this moving of the treadle may be readily done by the foot of the operator, and the treadle will, by reason of its connection to the pitman, as above described, serve to rotate the pulley C, whether the treadle be at a greater or less angle to the plane of the pulley C. I I' designate a standard or staff. The part I of the said staff is located on the side of the standard B, opposite the pulley C, and the shaft H passes through the said part I of the staff, and forms a fulcrum-pin on which the shaft I I' may oscillate (for purposes hereinafter mentioned) and not affect the tension of the belt J passing over the pulley C and over a pulley, O, which latter pulley will be presently described. The part I of the staff is bent at the upper end so as to lap over and upon the top of the standard B, and thereby bring the part I' directly over the pulley C, and this bent portion is provided with a hole for receiving a pin, *i*, which may be caused to enter the top of the standard and lock or hold the staff I I' in a vertical position whenever it may be desirable to hold it rigidly. The normal position of the shaft I I' should be vertical; and, to insure the return of the shaft to a vertical position after it has been oscillated or thrown from such position while operating upon the teeth of a person, I employ a spring, K, which is shown (see Fig. 3) as being a spiral spring and connected to the lower end of the staff I′ and at the other to the stand A. It is therefore obvious that the spring will cause the standard or arm I I′ to assume a vertical position after it has been oscillated to the right or left upon the arbor H. The upper portion of the staff I′ is tubular and receives the pintle L of a head, M. The lower end of the pintle has a center or point, *l*, which is stepped in a block, N, which block is provided on its under side with a leg of lesser diameter, which enters a spiral spring, *n*, by means of which spring the tension of the belt J is properly maintained at all times, whether the same be in the position shown in Fig. 1 or twisted (and hence shortened) by the turning round of the head. In the latter case the spring is depressed and the shortening of the belt J compensated for. The portion of the pintle L within the socket in the upper end of the staff or arm I I′ is enveloped in a tight-fitting sleeve, L′, having split ends, as shown at *l′*, (see Fig. 2,) the thus-separated portions being spread outward to act as springs to bear against the interior of the said socket and prevent rattling. The pulley O is a double-grooved pulley mounted on a shaft, P, having bearings in locks *m* rising from the head M. The shaft P is shown as provided with squared ends or portions *p* for the reception of a grindstone or emery wheel, *p′*, or a chuck or other device useful to the dentist, to which a rotary motion is to be imparted; and the head M is shown as provided with extensions *m′* to constitute rests, to be used in conjunction with the grindstone or emery wheel, &c. Q is an arm, one end of which is forked, as shown at *q q*, and these forked ends are pivoted upon tubular bosses, which form portions of the journal-bearing of the shaft P; and the other end of the said arm Q is tubular and receives an arm, R. The end of the arm R is arranged to slide in and out of the tubular arm Q, and its end is provided with a point or center, *r*, stepped in a sliding block, R′, similar to N, and behind this block I place a spiral spring, R″, which spring serves to keep the arm R thrust outward, and the tension of the belt *s* passing from the pulley O and around the pulley S is maintained. The arm R carries a bifurcated end, *r′ r′*, to which is pivoted a similar bifurcated end, *t t*, of an arm, T, the said arm being provided with a socket which receives within it a square bar, U, the end of which bar abuts against a spiral spring, U′, whereby the tautness of the belt V is maintained. The pulley S is mounted on an arbor or shaft, *t′*, which likewise forms the pivot uniting the bifurcated ends of the arms R and T. The bar U is provided with a bifurcated outer end or recessed head, *u*, in which is journaled a tubular socket, W, into which socket the shank *w* of the operating tool is inserted. The tool shown is a dental burr, and consists of the shank *w* and burr *w′*, which has bearings in the recessed head *u* and is rotated by the belt V. The shaft W, as well as a portion of the operating tool, is enveloped by a sleeve, W″, which is secured to the head *u*. This sleeve W″ gives journal-bearings to the socket or shaft W and tool-shank *w*, and serves as a means for holding the tool in the hand for guiding it while in use without in any degree interfering with the rotation of the shaft or of the tool. It may be desirable to construct the burr and its shank in two separate pieces instead of in one piece, so that when the outer portion of the burr becomes worn smooth the whole tool (head and shank) need not be thrown away. The shank *w* and the burr *w′* may be made in separate and distinct pieces, the burr being perforated to receive the end of the shank. This construction admits of the reversion of the burr upon the shank when the outer and most used portion becomes smooth, and also of the replacement of a worn-out burr by a new one, the shank being preserved. I provide an extension, *q′*, on one side of the bifurcated end of the arm Q, and this extension carries an out-turned end, *q″*, which comes in contact with the standard *m* when the arm Q is thrown upward a little beyond a vertical line, and by this means the said arm may be held in a nearly vertical position.

I have explained my preferred mode of constructing the machine, but do not wish to confine myself to the exact means shown to accomplish the result. For instance, in my experiments I have conveyed the power from the crank-pulley C to the pulley W′ by a single belt, the advancing and returning sides of which passed over separate loose pulleys at the points of flexure. I have also anticipated conveying power from the shaft P to the pulley W′ or socket-piece or spindle W by means of shafts turned by friction or spur-gearing at the points of flexure, and, in the case of friction-gears, I have proposed to use an extension joint similar to U U′ T to keep the friction-gears in proper contact, (the journal-bearings of the gear-shafts being connected by non-rotating but oscillating arms.)

I propose, in some or most cases, to envelop the moving parts, or especially the belts, in a covering of leather or other substance.

What I claim as my invention, and desire to secure by Letters Patent, is—

1. In a dental drilling-machine for operating upon the teeth while in the mouth, the combination of the following elements: A foot-treadle, two or more pulleys with belt-connection, a revolving shaft or spindle, a dental tool, and a sleeve surrounding the whole or a part of the said shaft, substantially as and for the purposes herein specified.

2. In a dental drilling-machine for operating upon the teeth while in the mouth, I claim an arm consisting of two or more flexibly-connected sections, when one of said sections is made tubular for a portion of its length so as to receive within it the end of another of said sections, thereby producing an extensible or telescopic joint for shortening or lengthening said arm, in combination with a sleeve which surrounds and forms a bearing for the outer end of that section of said arm which carries the operating-tool, and with one or more wheels and a foot-treadle from which power is transmitted to the said operating-tool, substantially as herein specified.

3. In a dental drilling-machine for operating upon the teeth while in the mouth, I claim the combination, with an arm for carrying the operating-tool, of a vertical staff or standard pivoted to a stationary stand, and arranged to oscillate on such pivot or fulcrum-pin, and provided with a spring for causing it to assume a vertical position after being released from an inclined position, substantially as and for the purposes herein specified.

4. In a dental drilling-machine for operating upon the teeth while in the mouth, I claim the combination of the following parts: A rigid spindle or shaft adapted to carry a dental tool or burr; a sleeve surrounding the whole or a part of the said shaft, so as to furnish bearings for the same and afford support for the hand of the operator; and a pulley secured to the rear end of the said shaft, and provided with an endless belt for transmitting continuous motion from any suitable motor by said shaft, substantially as herein specified.

5. In a dental drilling-machine for operating upon the teeth while in the mouth, I claim the combination, with the standards I I′, of the standard L, the latter being provided with a cylindrical end which enters a corresponding socket in the former so as to permit the swiveling of the latter and its attachments, as and for the purpose herein specified.

6. In a dental drilling-machine for operating upon the teeth while in the mouth, I claim the combination, with the stand, of a treadle consisting of the parts F and G, the part F being connected by a universal joint to the pitman-rod, and the part G being pivoted to the said stand, substantially as and for the purposes herein specified.

JAMES B. MORRISON.

Witnesses:
H. JUDD,
WM. N. MORRISON.